United States Patent [19]
Schiel et al.

[11] Patent Number: 5,878,507
[45] Date of Patent: Mar. 9, 1999

[54] APPARATUS FOR A PAPER-MAKING MACHINE FOR DELIVERING LIQUID FROM A FIRST LEVEL TO A SECOND, HIGHER LEVEL

[75] Inventors: Christian Schiel, Heidenheim; Erich Grundler, Nattheim, both of Germany

[73] Assignee: Voith Sulzer Papiermaschinen GmbH, Germany

[21] Appl. No.: 710,634

[22] Filed: Sep. 18, 1996

[30] Foreign Application Priority Data

Sep. 18, 1995 [DE] Germany .................. 195 34 571.1

[51] Int. Cl.⁶ .................................................. D06F 58/00
[52] U.S. Cl. .................................. 34/119; 34/124; 34/125
[58] Field of Search .................... 34/119, 124, 125, 34/446, 449, 454, 552; 165/89, 90; 137/565, 590

[56] References Cited

U.S. PATENT DOCUMENTS

| | | | |
|---|---|---|---|
| 4,493,158 | 1/1985 | Van Os | 34/454 |
| 4,700,493 | 10/1987 | Wedel et al. | 34/124 X |
| 4,753,017 | 6/1988 | Gilbert, Sr. | 34/119 X |
| 5,524,355 | 6/1996 | Schiel et al. | 34/119 |

FOREIGN PATENT DOCUMENTS

| | | |
|---|---|---|
| 2413271 | 10/1974 | Germany . |
| 4401582 | 9/1994 | Germany . |
| 1425549 | 2/1976 | United Kingdom . |

*Primary Examiner*—Henry A. Bennett
*Assistant Examiner*—Steve Gravini
*Attorney, Agent, or Firm*—Ostrolenk, Faber, Gerb & Soffen, LLP

[57] ABSTRACT

An apparatus and a method are indicated for a paper-making machine, for delivering liquid from a first level in a first space, through a line into a second space on a second, higher level, under the action of a difference in the gas pressures over the liquid in the first space and in the second space. A throttle valve in the line is controlled, to regulate the fluid flow, in such a way that the throttle valve is at least partly closed when the gas flow through the line rises, and is opened when there is little gas flow through the line. This guarantees continuous delivery of liquid, stable flow conditions prevail, and a delivery that is largely free of pulsation is achieved with a low proportion of gas (FIG. 2).

12 Claims, 3 Drawing Sheets

APPARATUS FOR A PAPER-MAKING MACHINE FOR DELIVERING LIQUID FROM A FIRST LEVEL TO A SECOND, HIGHER LEVEL

The invention relates to an apparatus for a paper-making machine for delivering liquid from a first level in a first space, through a line into a second space on a second, higher level, under the action of a difference in the gas pressures over the liquid in the first space and in the second space, in particular for extracting liquid from a roll.

An apparatus and a method of this kind are known from DE 44 01 582 A1. In the known apparatus, delivery of the liquid from the first level to a second, higher level occurs with the aid of a gas pressure difference between the first space (infeed space) and the second space (outfeed space). In order to prevent unstable flow conditions and pulsation, and to minimize the proportion of gas in the connecting line from the first level to the second level, a gas separator, from which the liquid is delivered back onto the second level by means of a further line, is arranged in a suction line for extraction of the liquid.

It has been found that while the known apparatus operates satisfactorily with liquids of relatively low viscosity, correct operation is no longer assured with liquids of higher viscosity or if there is a greater tendency toward foaming. The problems that then result are those which occur generally when liquids are delivered by means of a gas pressure difference from an inflow to an outfeed at a higher level, specifically that in general a certain gas volume is delivered together with the liquid. As soon as gas is flowing together with the liquid through the line, non-steady-state flow behavior occurs. The greater the proportion of gas, the greater the throughput of delivered liquid, since the gas carries liquid along. But because gas is not available in unlimited quantity in the infeed space, the pressure there very quickly drops, so that no further liquid delivery occurs due to a lack of pressure difference. As a result the liquid volume in the inflow space once again increases until a sufficient pressure difference is again available to extract liquid through the line. The result—despite the gas separator in the extraction line—is therefore undesired pulsation and non-steady-state flow conditions. Moreover it is no longer certain that, even if multiple parallel extraction tubes are present, all the suction tubes will always deliver liquid if it is made available at the suction tube inflow.

Problems of this kind occur at many points in a paper-making machine, for example with drying cylinders of papermaking machines in which condensate needs to be discharged to the outside from the interior of the cylinder by means of siphons, or in shoe presses in which a blanket circulates on a film of liquid, by means of a hydrostatically applied pressing shoe, on a hydrodynamic lubricating wedge. In this instance the excess lubricant must be extracted from the vicinity of the pressing shoe and fresh lubricant must in turn be supplied to other points so that the lubricant film remains stable.

It is thus the object of the invention to create an apparatus and a method for a paper-making machine for delivering liquid from a first level in a first space through a line to a second, higher level with the aid of a gas pressure difference, with which continuous delivery of the liquid is guaranteed, stable flow conditions prevail, and a delivery is achieved that is largely free of pulsation. The gas volume required for delivery is to be kept as low as possible. In addition, the greatest possible insensitivity to changes in the state of the fluid is to be achieved. In particular, reliable operation is to be guaranteed even if, for example, the volume of liquid delivered is the same as or even greater than the amount of gas consumed in order to effect delivery.

This object is achieved, in an apparatus of the type mentioned above, by the fact that a throttle valve is provided to regulate the fluid flow through the line; and that the throttle valve for throttling the fluid flow is controlled as the gas flow through the line rises.

The object is furthermore achieved, with regard to the method, by the fact that in the method of the type mentioned above, the flow of the fluid through the line is throttled when the gas volume flowing through the line increases.

This is achieved, according to the invention, by the fact that whenever the proportion of gas in the fluid flow extracted from the first space increases, the fluid volume delivered through the extraction line is throttled. Since the overall volume of liquid extracted increases sharply, because of the entrainment effect, as the proportion of gas in the extraction line increases, the throttling system thus counteracts this effect, so that the extracted liquid volume is regulated to a steady-state, stable value. This feature operates very reliably even with liquids of high viscosity or when there is a greater tendency toward foaming, since the variable that in apparatuses of conventional type was responsible for the inhomogeneous discharge, namely the gas volume delivered from the first space into the second space, is utilized directly to regulate the volume of liquid discharged.

A particular advantage of the invention is the fact that a relatively small gas volume is required in order to effect delivery of the liquid to a higher level. The mass ratio of liquid delivered to gas volume consumed can advantageously lie in a range between approximately 1:10 to approximately 10:1, a ratio of approximately 1:1 being desirable.

According to a development of the invention, a sensor which detects the gas flow volume is arranged in the first space or the second space. Based on the gas flow volume detected, the throttle valve in the line from the first space to the second space can then be controlled via an actuator in such a way that as the gas flow volume rises, the fluid flow through the line is throttled. It is understood that the sensor can also detect other manipulated variables in order to achieve throttling of the throttle valve as the proportion of gas in the discharged fluid rises. Thus in the simplest case, for example, instead of the gas flow volume simply the pressure difference between the first space and the second space could also be detected. Numerous embodiments of the actuator are also conceivable.

According to a preferred development of the invention, the line opens into a float in the second space that is immersed at least partly into the liquid in the second space, and controls the throttle valve by way of its buoyancy.

A particularly simple control system for the throttle valve is achieved in this manner, since the buoyancy of the float, which naturally depends on the gas volume delivered into the float through the line, can be utilized directly to adjust the throttle valve, so that a separate actuator can be dispensed with.

Although stabilization or approximate stabilization of the height of the liquid surface in the second space, into which the float is at least partly immersed, is not absolutely necessary for operation of the throttle valve regulation system, according to a development of the invention a device for stabilizing the height of the liquid surface is provided in the second space.

More uniform regulation of the throttle valve, largely independent of external fluctuations, can be achieved in this manner. In the simplest case the device for stabilizing the height of the liquid surface could consist of a spillover weir or the like. Other possibilities for stabilization are also, of course, conceivable, for example a spillover that operates on the principle of communicating tubes, or stabilization by means of level sensors by which the corresponding outfeed valves are opened or closed.

In a preferred development of the invention, the float is configured as a bell-like element, open toward the bottom, which has a vent nozzle at its top end.

This results in a particularly simple embodiment of the float. If predominantly liquid is being delivered through the line, the liquid thus emerges at the bottom end of the bell-like element and the bell-like element cannot develop any buoyancy, since no gas volume collects in the bell. If a very small gas volume is delivered as well, it immediately emerges through the vent nozzle. The float will thus sink down under its own weight, causing the throttle valve to remain open. If the proportion of gas in the fluid flow delivered through the line then rises, a greater gas volume, which cannot immediately escape upward through the vent nozzle, thus passes into the bell-like element. Because of the enclosed gas volume the bell-like element thereby experiences an upward buoyancy that can be used to throttle the throttle valve. When the gas volume in the delivered fluid flow then drops due to throttling of the fluid flow through the line, the gas volume collected under the bell-like element will then gradually bleed off upward through the vent nozzle, so that the buoyancy of the float drops and the throttle valve is in turn opened again.

According to a further embodiment of the invention, the throttle valve comprises a sliding sleeve displaceable on the line, by means of which an exit opening of the line can be at least partly closed off.

A particularly simple embodiment of the throttle valve is thereby achieved.

In an additional development of the aforesaid embodiment, the sliding sleeve is arranged vertically displaceably on the line, and is rigidly joined to the float.

This combination results in a particularly simple regulating system for the throttle valve so as either to open the exit opening when buoyancy is low or absent, or in order to make the exit opening smaller as the buoyancy rises and thus throttle the fluid flow through the line.

According to an alternative embodiment of the invention, the line is configured as a tube that has at least one entrance opening on the first level and one exit opening on the second level, the throttle valve comprising a piston, guided in the tube, by means of which the entrance opening can be at least partly closed off, and the piston being mounted at the bottom end of a piston rod that is displaceably guided at a top end of the tube and is rigidly joined at its top end to the float.

The buoyancy of the float is once again used here in order to reduce flow volume through the throttle valve when the gas flow is high. In contrast to the embodiment described earlier, however, in this case regulation occurs at the infeed into the line, specifically by the fact that at least one entrance opening is made smaller by the piston as the buoyancy rises. For this purpose the float is rigidly joined to the piston via the piston rod. If, on the other hand, the gas flow through the line increases and the buoyancy of the float becomes greater, the at least one entrance opening is then made smaller by the piston, thus throttling the fluid flow.

In a further advantageous embodiment of the invention, the float is preloaded by a spring in such a way that the throttle point is largely open when buoyancy is low.

This feature makes it possible to achieve an improvement in the regulation characteristics, since not only is the weight of the float being used for return purposes, but the preload of the spring is available and moreover can be matched to the particular application; progressively acting springs are also possible so that nonlinear control characteristics can be produced.

In an advantageous development of the invention, a top and a bottom stop are provided to delimit the top and bottom end positions of the float.

In the first-mentioned embodiment of the float in which regulation occurs at the exit end of the line, projections on the line, as stops for the sliding sleeve, are sufficient for this.

If the second embodiment of the throttle valve mentioned above is used, however, a plug that closes off the bottom end of the line can serve as the bottom stop for the piston, provided a pressure equalization opening passes through the piston. The top stop can be either an external stop for the float, or a projection on the piston rod with which the latter comes into contact on its guide at the top end of the vertical tube.

According to an additional development of the invention, the line is joined directly to the second space, bypassing the throttle point, via an overpressure valve that opens when a predefined pressure is exceeded.

This feature provides additional reliability under extreme operating conditions or with extremely non-steady-state processes, since even with the throttle valve closed a flow will always be possible if the predefined differential pressure of the overpressure valve is exceeded.

In a roll equipped with a plurality of lines for extracting liquid from the interior of the roll, each line is preferably coupled to an extraction device according to the invention.

This guarantees homogeneous extraction and ensures low gas consumption.

It is understood that the features mentioned above and those yet to be explained below can be used not only in the respective combinations indicated, but also in other combinations or in isolation, without leaving the context of the present invention.

Further features and advantages of the invention are evident from the description below of preferred exemplified embodiments with reference to the drawings, in which.

Figure 1:
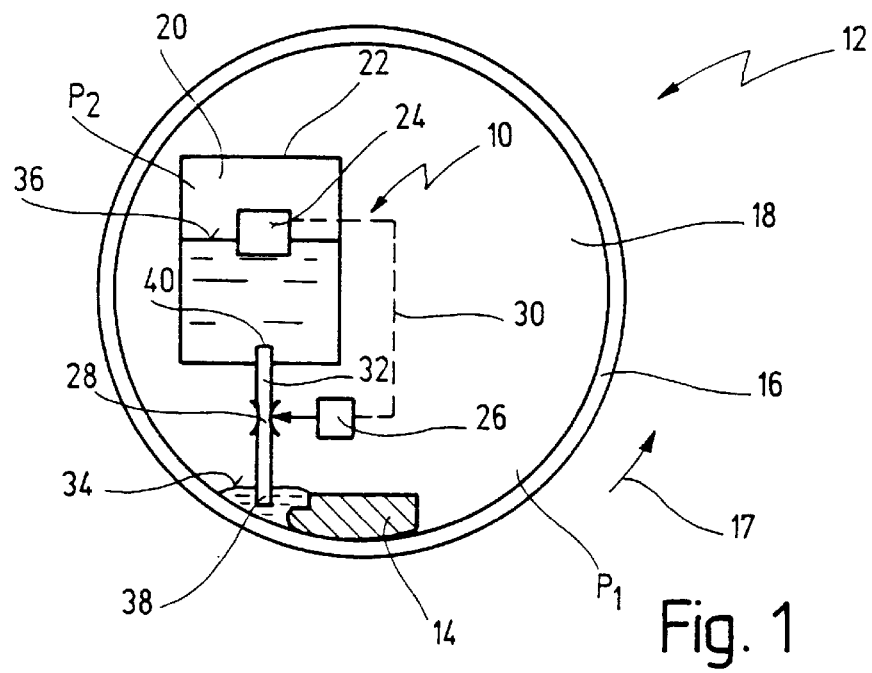
FIG. 1 shows a cross section of a shoe press roll, in a highly simplified depiction in which only the apparatus according to the invention, the pressing shoe, and the blanket are shown.

FIG. 1 shows a shoe press roll for a paper-making machine, designated overall with the number 12, in a highly simplified depiction. Shoe press roll 12 comprises, in a known manner, a supporting member (not shown) supported at its two external pivots, and a pressing shoe 14 over which a continuous blanket 16 circulates on a hydrodynamic lubricating film. As is evident in more detail from FIG. 2, pressing shoe 14 is applied hydrostatically against a counter-roll (not shown) by means of application elements 60, so as to dewater the aqueous paper web guided through the pressing gap together with at least one felt web.

Depiction of the supporting member or further details of the shoe press roll was omitted in FIG. 1 for the sake of clarity, so that only the principle of apparatus 10 according to the invention could be explained.

Blanket 16 is sealed at the end surfaces of shoe press roll 12 by means of side plates 64 (see FIG. 3), resulting in a first space 18 or infeed space, enclosed by blanket 16, within which a gas pressure $p_1$ is present.

In order to guarantee a sufficient hydrodynamic lubricating film for blanket 16 even when pressures in the pressing gap are high, lubricant must continuously be supplied in the region of pressing shoe 14 through a plurality of openings, while the excess lubricant collects in the region to the left, as depicted in FIG. 1, in front of the pressing shoe, if shoe press roll 12 rotates counterclockwise as indicated by arrow 17. The excess lubricant must be continuously extracted and is delivered through a line 32 into a second space 20 located above it, which is surrounded by a container 22. Above the liquid surface indicated with the number 36, there exists in second space 20 a gas pressure $p_2$ which is lower than the gas pressure $p_1$ above liquid surface 34 in first space 18. Excess lubricant is sucked in through the opening at the bottom end of line 32 and delivered into second space 20 as a result of the gas pressure difference $p_1-p_2$. Arranged inside second space 20 is a sensor which is merely indicated schematically with the number 24. Sensor 24 senses the gas flow volume of the gas flowing into the second space through line 32, or the gas volume discharged to the outside from second space 20. Located in line 32 is a throttle valve 28 that can be controlled, with the aid of the signal received from sensor 24, via a control line 30 by means of an actuator 26.

Since the intention is always to transport the same oil volume, but as little gas as possible, from first space 18 into second space 20, throttle valve 28 is controlled by actuator 26, as a function of the signal received from sensor 24, in such a way that the flow volume through throttle valve 28 is diminished when the gas flow volume sensed by sensor 24 rises. Conversely, throttle valve 28 opens when the gas volume being delivered falls below a preset value. The result is that first liquid surface 34 in front of pressing shoe 14 is kept at the lowest level, and that a collapse of the differential pressure $p_1-p_2$ cannot occur even when multiple parallel lines 32 are present. A continuous, largely laminar extraction of excess lubricant through line 32, free of pulsation and the like, is thus established.

The mass ratio between delivered liquid and delivered gas lies in a range of approximately 1:10 to 10:1, a value in the range of approximately 1:1 usually being set, so that very little gas is needed to deliver the liquid to a higher level.

Figure 4:
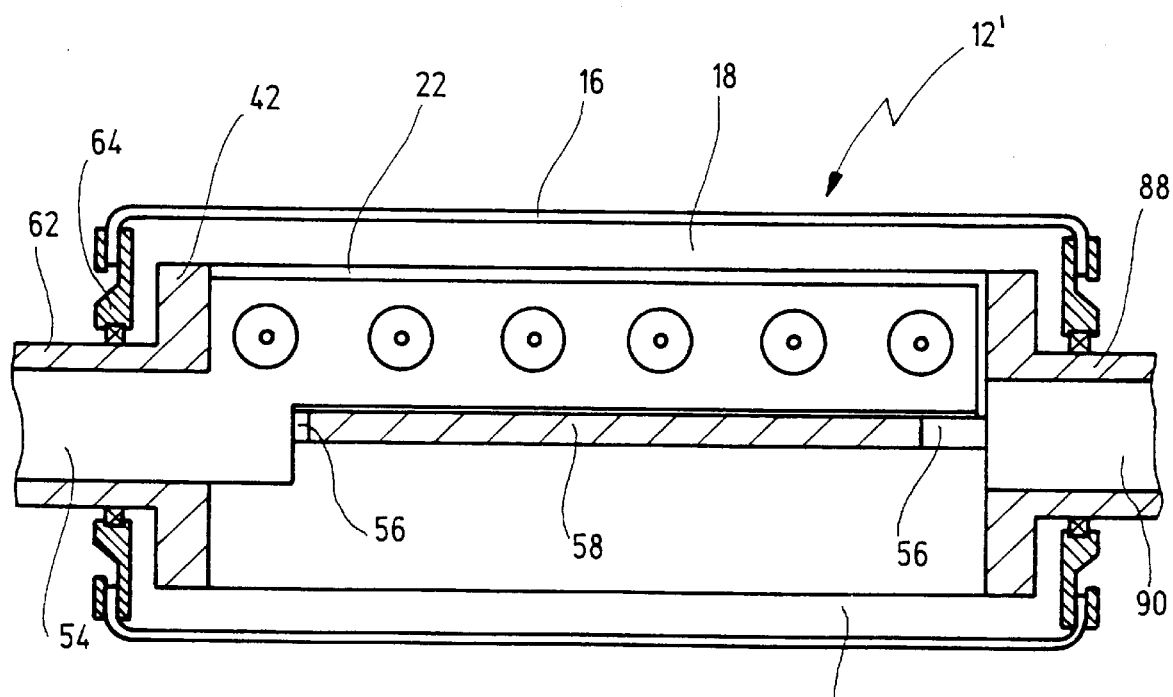
FIG. 4 shows a section through the shoe press roll according to FIG. 2 along line IV—IV (at reduced scale)
Figure 2:
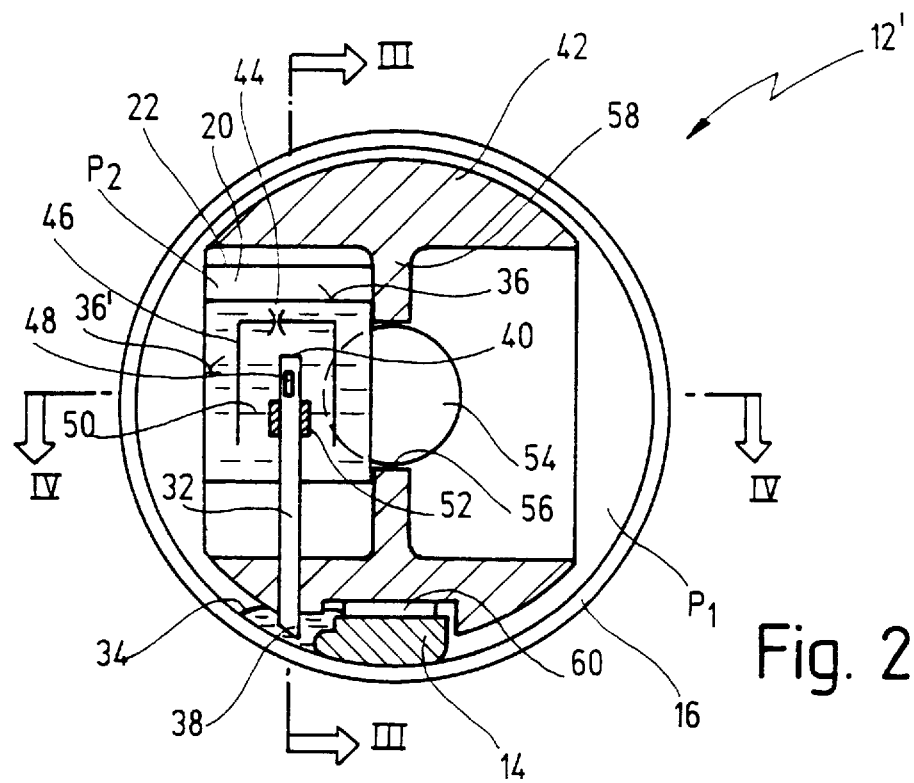
FIG. 2 shows a cross section of a shoe press roll with an alternative embodiment of the apparatus according to the invention.
Figure 3:
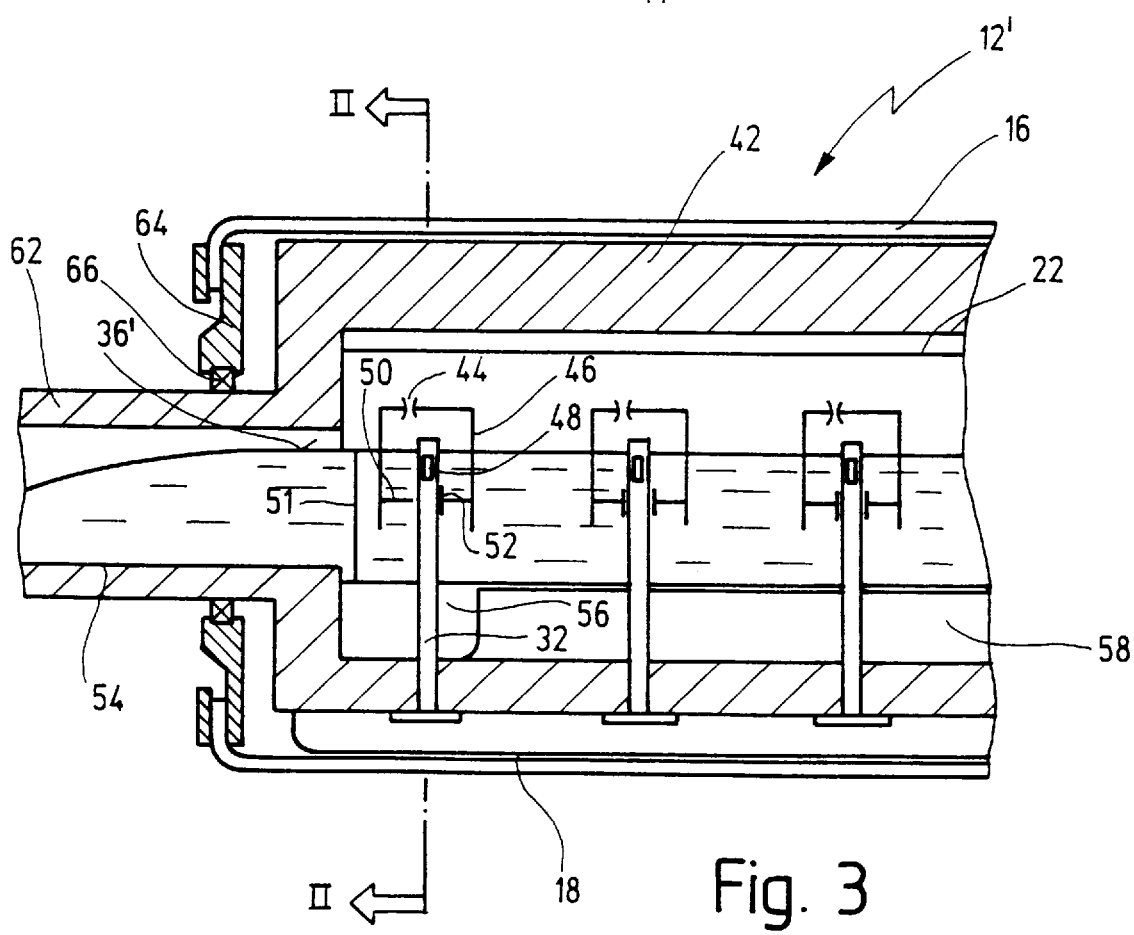
FIG. 3 shows a section through the shoe press roll according to FIG. 2 along line III—III.

An embodiment of a press roll slightly modified as compared to the embodiment according to FIG. 1 is designated overall as 12' in FIGS. 2 to 4.

Also schematically depicted in addition to blanket 16 and pressing shoe 14 is supporting member 42, whose cross section has the basic shape of a double-T support that is rounded into circle segments at the top and bottom end to guide the peripheral pressing shoe 16. Supporting member 42 comprises a center web 58 that connects the top and bottom halves. Supporting member 42 ends, at both ends of press roll 12', in pivots 62, 88 (see FIG. 4) that can be mounted in linear ball bearings on the machine frame (not depicted). Passing through pivots 62, 88 of supporting member 42 are coaxial openings 54, 90, respectively. Also rotatably mounted on pivots 62 and 88 by means of pivot bearings 66 are side plates 64, with which first space 18 enclosed by blanket 16 is sealed at the ends.

Container 22 (FIG. 2), which is sealed with respect to the right-hand, guide-side pivot 88 of shoe press roll 12' and attached sealingly to supporting member 42 on the drive system side, is provided in a cavity on the left next to center web 58 of supporting member 42. An aperture 56 at the end of center web 58, through which space 20 is connected to bore 54 of pivot 62, serves to discharge lubricant (FIG. 3). Lubricant can be supplied through a supply line (not depicted) through one of the two pivot bores 54 or 90.

According to FIG. 2, line 32 has a bottom end 38 with an infeed nozzle (not depicted in further detail) that is immersed into the liquid in front of pressing shoe 14. Line 32 is configured as a vertical tube, and has in the region of its top end 40 one or more exit openings 48 in the form of elongated slots. Located on line 32 is a sliding sleeve 52 which is displaceable in the region of exit openings 48 so that exit openings 48 can thereby be opened or closed.

Line 32 is surrounded, in the region of its top end 40, by a float 46 that is configured as a bell- or cup-shaped member open toward the bottom, and is rigidly connected via a linkage 50 to sliding sleeve 52. A vent nozzle 44, which allows gas to escape slowly from the space enclosed by float 46 upward into second space 20, is provided at the top end of float 46.

Throttle valve 28 operates, in conjunction with float 46, as follows:

Liquid is discharged upward through the infeed nozzle at the bottom end of line 32 as a result of the gas pressure difference $p_1-p_2$ (which can, for example, be maintained by fans), and can emerge through exit openings 48 if sliding sleeve 52 is located, due to the weight of float 46, in its bottom end position or in its vicinity, so that exit openings 48 are uncovered. If the gas volume entrained through line 32 then increases to the point that it can no longer immediately escape through vent nozzle 44 upward out of float 46, a gas bubble thus gradually collects inside float 46, causing float 46 to experience a buoyancy because the latter is at least partly immersed in the liquid in second space 20. If the buoyancy exceeds the weight of float 46, the float moves upward along with sliding sleeve 52, and thus begins to close exit openings 48 so that the flow through line 32 is decreased. The gas volume delivered through line 32 thereby simultaneously drops, so that the gas bubble in float 46 can gradually escape through vent nozzle 44, so that the buoyancy drops and sliding sleeve 52 can move back downward.

This results in regulation of the fluid delivered through line 32 as a function of the gas volume delivered along with it.

The height of liquid surface 36 inside second space 20 is preferably kept constant, for which purpose, for example, a spillover panel 51 according to FIG. 3 can be provided. The height of liquid surface 36 in the second space is not critical, so long as it is certain that float 46 is at least partly immersed in the liquid. Operability is thus ensured both with a liquid surface 36 at which float 46 is completely immersed in the liquid, and with a liquid surface 36' that lies below the level of liquid surface 36, but at which float 46 is still partly immersed in the liquid.

Figure 5:
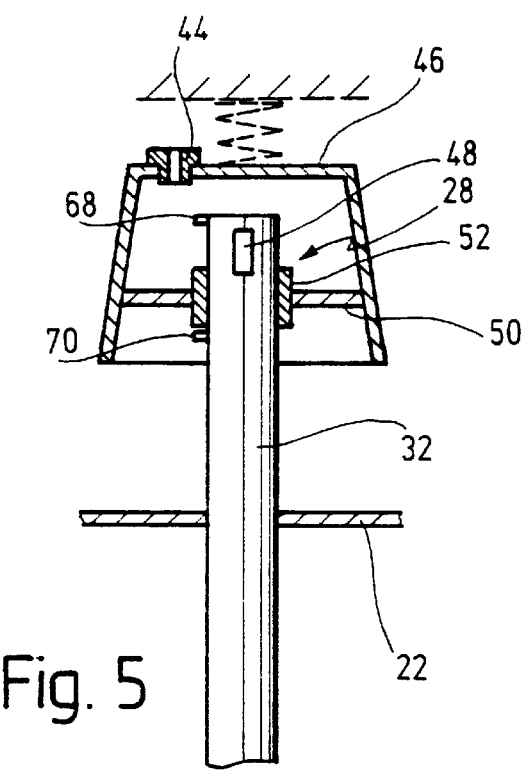
FIG. 5 shows a section through the throttle valve according to FIG. 2 in an enlarged depiction in the region of the top end of the line.

FIG. 5 shows throttling point 28 with float 46, at enlarged scale. Also visible in this depiction are a top stop 68 and a bottom stop 70 on line 32 to delimit the displacement path of sliding sleeve 50 [sic]. According to FIG. 5, float 46 can also flare out downward slightly so as to produce somewhat modified control characteristics. Otherwise the embodiment according to FIG. 5 corresponds to the embodiment explained previously with reference to FIGS. 2 to 4.

Figure 6:
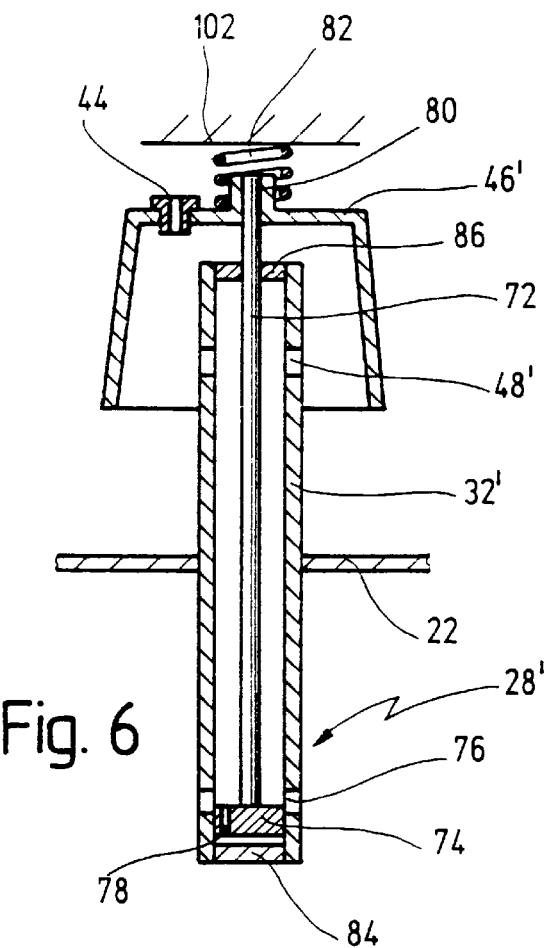
FIG. 6 shows a modification of the embodiment according to FIG. 5.

A modification of the throttle valve is shown in FIG. 6 and designated with the number 28'. Otherwise, corresponding reference numbers are used for corresponding parts. Connecting line 32' is configured as a vertical tube that is closed off at its bottom end by a plug 84 and at its top end by a ring 86. Multiple entrance openings 76 are provided above plug 84 in the side wall of tube 32', while multiple exit openings 48' are provided in the region of the top end of tube 32'. A piston 74, by means of which entrance openings 76 can be closed off, is guided displaceably inside tube 32'. The piston is rigidly joined to a piston rod 72 that projects at its top end upward out of tube 32' and is displaceably guided on ring 86. The top end of piston rod 82 is rigidly joined to a collar 80 of float 46', which otherwise corresponds entirely to float 46 previously described with reference to FIGS. 1 to 5.

Piston 74 has a pressure equalization opening 78 passing through it in the vertical direction, so that piston 74 can move downward to plug 84 which serves as stop for the bottom end position. The top end position of piston 74 is delimited by a stop 102 that is mounted on container 22 (not shown). Piston 74 is thus displaceable upward and downward, inside line 32' that is configured as a vertical tube, by a certain amount that is delimited at the top by contact between collar 80 of float 46' and stop 102, and at the bottom by contact between piston 74 and plug 84 at the bottom end of line 32'. A helical spring 82, by which float 46' is forced downward, is additionally arranged between collar 80 and stop 102.

Piston 74 acts, in conjunction with entrance openings 76, as a throttling point 28', the flow through which is determined by the position of the piston with reference to entrance openings 76. Pressure equalization opening 78 allows piston 74 to move to the bottom end position in contact against plug 84.

Spring 82 makes it possible to achieve a finer adjustment of the control characteristics of throttle valve 28', since the return force results not only from the weight of the float or the piston rod and piston, but is determined by the spring force. Thus fine adjustment of throttle valve 28', and progressive control characteristics for it, can be achieved by selecting the spring characteristics of spring 82.

As indicated with dashed lines in FIG. 5, a spring of this kind can of course also be used advantageously in the embodiment according to FIG. 5.

Figure 7:
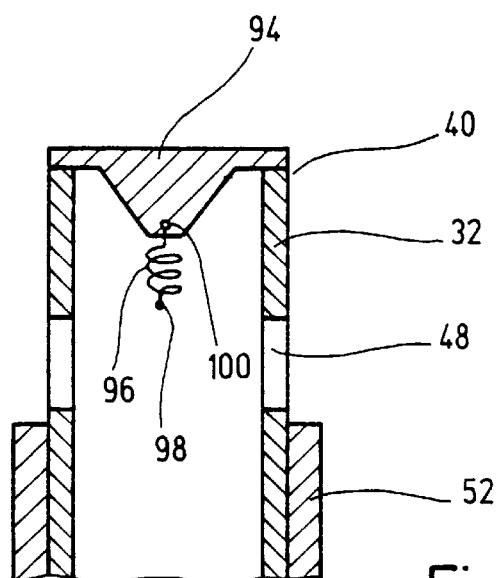
FIG. 7 shows a longitudinal section through the line in the region of the exit openings in an enlarged depiction, an overpressure valve additionally being provided.

FIG. 7 shows a further modification of the embodiment according to FIG. 5, in which the top end of line 32 is not simply closed off, but is closed off by an overpressure valve 94 that opens when a predefined differential pressure between the interior of line 32 and second space 20 is exceeded. This safety function is merely indicated schematically by a spring 96 that is mounted on the wall of line 32 via pins 98, 100, and preloads overpressure valve 94 in the closing direction.

We claim:

1. An apparatus for a paper-making machine for delivering a liquid, of a combined liquid and gas flow, from a first level in a first space to a second higher level in a second space, said apparatus comprising pressure means for exerting a first gas pressure over said liquid within said first space;

pressure means for exerting a second gas pressure over said liquid within said second space, said second gas pressure being smaller than said first gas pressure;

a line communicating with said first and second spaces for carrying said flow from said first space to said second space in accordance with said first and second gas pressures;

a throttle valve provided within said line; and a controller for controlling said flow through said throttle valve such that said flow reduces as said gas flow rises and increases as said gas flow decreases.

2. The apparatus as defined in claim 1, further comprising:

a sensor for sensing gas flow into or out of said second space, said sensor coupled to said controller; and an actuator coupled to said throttle valve, wherein said line opens directly into said second space.

3. The apparatus as defined in claim 1, further comprising a float provided in said second space and immersed at least partly within said liquid in said second space, wherein said line opens into said float and said float controls said throttle valve by way of its buoyancy.

4. The apparatus as defined in claim 3, further comprising a device for stabilizing the height of the liquid level within said second space.

5. The apparatus as defined in claim 3, wherein said float is configured as a bell-like element which is open at its bottom end and which comprises a vent nozzle at its top end.

6. The apparatus as defined in claim 1, wherein said throttle valve comprises an exit opening provided on said line and a sliding sleeve arranged displaceably on said line and being adapted to at least partly close off said exit opening.

7. The apparatus as defined in claim 6, wherein said sliding sleeve is arranged vertically displaceably on said line and is rigidly joined to said float.

8. The apparatus as defined in claim 3, wherein:

said line comprises a tube having at least one entrance opening communicating with said first space and at least one exit opening communicating with said second space; and said throttle valve comprises a piston guided within said tube and adapted to at least partly seal off said entrance opening, said piston being connected to a piston rod that is displaceably guided at a top end of said tube and is rigidly joined at its top end to said float.

9. The apparatus of claim 3, wherein said float is preloaded by an elastic element so as to substantially open said throttle valve when buoyancy is low.

10. The apparatus of claim 3, comprising a top stop and a bottom stop for delimiting movement of said float between a bottom and a top position.

11. The apparatus of claim 1, comprising an overpressure valve which is connected to said line and is adapted to bypass said throttle valve when a predefined pressure within said line is exceeded.

12. A roll for a paper-making machine, comprising a plurality of lines for extracting liquid from said roll, each line comprising an apparatus as defined in claim 1.

* * * * *